United States Patent
Chang

(10) Patent No.: US 8,588,761 B2
(45) Date of Patent: Nov. 19, 2013

(54) METHOD OF HANDLING MEASUREMENT REPORTING AND RELATED COMMUNICATION DEVICE

(75) Inventor: Kuo-Liang Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 14 days.

(21) Appl. No.: 13/412,554

(22) Filed: Mar. 5, 2012

(65) Prior Publication Data

US 2013/0090111 A1    Apr. 11, 2013

Related U.S. Application Data

(60) Provisional application No. 61/544,290, filed on Oct. 7, 2011.

(30) Foreign Application Priority Data

Nov. 10, 2011  (TW) .............................. 100141020 A

(51) Int. Cl.
H04W 4/00 (2009.01)

(52) U.S. Cl.
USPC .................... 455/422.1; 455/432.1; 455/423; 455/442; 455/436; 455/439; 455/418; 455/435.2; 370/338; 370/331; 370/349; 370/409; 370/339

(58) Field of Classification Search
USPC .............. 455/422.1, 423, 421, 442, 436, 439, 455/432.1; 370/338, 349, 409
See application file for complete search history.

(56) References Cited

U.S. PATENT DOCUMENTS

| | | | | |
|---|---|---|---|---|
| 2003/0232622 | A1 * | 12/2003 | Seo et al. ...................... | 455/437 |
| 2004/0032845 | A1 * | 2/2004 | Chen ............................. | 370/338 |
| 2006/0089142 | A1 * | 4/2006 | Vuorinen et al. ............. | 455/436 |
| 2007/0123262 | A1 * | 5/2007 | Proctor, Jr. .................... | 455/442 |
| 2008/0130582 | A1 * | 6/2008 | Lee et al. ...................... | 370/332 |
| 2010/0273472 | A1 | 10/2010 | Drewes | |

OTHER PUBLICATIONS

Acer, Improvement of event 1c race condition handling in UTRAN to avoid call drop, 3GPP TSG-RAN2 Meeting #76, R2-115722, Nov. 14-18, 2011, XP050563941, San Francisco, USA.
Nokia, Intra-frequency measurement events, TSG-RAN Working Group 2 (Radio layer 2 and Radio layer 3), TSGR2#4(99)430, May 22-28, 1999, XP050112783, Berlin.

* cited by examiner

*Primary Examiner* — Khalid Shaheed
(74) *Attorney, Agent, or Firm* — Winston Hsu; Scott Margo

(57) ABSTRACT

A method of handling measurement reporting for a network in a wireless communication system is disclosed. The network maintains an active set for storing at least a cell identity which is capable of providing a service to a mobile device of the wireless communication system. The method includes receiving a measurement report message from the mobile device, wherein the measurement report message is used for notification of a cell replacement procedure and includes a first cell identity corresponding to a first cell, determining whether the first cell identity is included in the active set and whether a number of the cell identity in the active set exceeds a threshold, to generate a result, and performing the cell replacement procedure according to the result.

6 Claims, 5 Drawing Sheets

US 8,588,761 B2

METHOD OF HANDLING MEASUREMENT REPORTING AND RELATED COMMUNICATION DEVICE

CROSS REFERENCE TO RELATED APPLICATIONS

This application claims the benefit of U.S. Provisional Application No. 61/544,290, filed on Oct. 7, 2011 and entitled "Method of Handling Measurement Reporting and Related Communication Device" the contents of which are incorporated herein in their entirety.

BACKGROUND OF THE INVENTION

1. Field of the Invention

The present invention relates to a method utilized in a wireless communication system and a communication device thereof, and more particularly, to a method of handling measurement reporting in a wireless communication system and a related communication device.

2. Description of the Prior Art

A Universal Mobile Telecommunications System (UMTS) is the 3rd generation mobile communication technology. A Universal terrestrial radio access network (UTRAN) includes a core network, which is composed of a plurality of Node Bs and a plurality of base station controllers (or radio network controllers, RNCs).

For communication quality maintenance, user equipments (UEs) may perform a measurement, to measure strength or signal noise ratio (SNR) of wireless signals. The UTRAN first has to send a measurement control message to a UE before the UE performs the measurement. The measurement control message includes a field of "measurement type", which defines the measurement type (e.g. intra-frequency measurement) that the UTRAN request the UE to perform.

On the other hand, a measurement result is sent from the UE to the UTRAN by a measurement report message. Note that, with a field of "measurement report criteria" of the measurement control message, the UTRAN indicates which events trigger measurement report to the UE. For example, the UE may report the measurement result when a measured signal strength or SNR at a common pilot channel (CPICH) of a cell not included in an active set is greater than a CPICH of a cell included in the active set. The above condition is defined as a 1c type event and a condition for triggering the 1c type event is complied with a number of the cell in the active set is greater than or equal to a cell replacement activation threshold, wherein the cell replacement activation threshold is a minimum number of cells allowed in the active set, and can be configured with the measurement control message. The detailed description can be referred to 3GPP TS 25.331, so it is not given herein. However, the 1c type event may cause cells with poor signal strength or the SNR to be replaced.

Note that, if the UTRAN does not update the active set (e.g. the network does not send an active set update message or the UE does not receive the active set update message) after the UE sends the measurement report message, the UE may send a new measurement report message after a predefined interval (hereinafter called time-to trigger (TTT)). On the other hand, the UE may periodically send the measurement report message to the network according to a periodic reporting interval. For example, the network sets the periodic reporting interval to be 5 seconds, thereby the UE may send measurement report message to the network every 5 seconds.

However, in the current 3rd generation partnership project (3GPP) specification, when the network receiving the measurement report message triggered by the 1c type event, the network may indicate the UE to remove cells with good signal strength or SNR in the active set, causing a call drop and affecting a experience of a user, the detailed reasons is as following.

Please refer to FIG. 1, which is a schematic diagram of a conventional measurement reporting. In FIG. 1, the UE sends a first measurement report message (triggered by the 1c type event) to the network, to trigger a cell replacement procedure. The first measurement report message notifies the network to replace a cell B or C with a cell D. Assuming that the signal quality of the cell C is the weakest cell in the active set ASET, and thereby, the intention of the UE is to replace the cell C with the cell D.

According to the 3GPP specification, when the network handling the first measurement report message but a active set update message in response to the first measurement report message has not been sent to the UE, for example, the network does not response to all measurement report messages (e.g. the network considers that the communication quality of the cell does not need to be replaced), the UE may send a second measurement report message (triggered by the 1c type event) to the network actively after the TTT/periodic reporting interval, to trigger another cell replacement procedure, wherein the second measurement report message notifies the network to replace cell B or C with a cell E.

Note that, before the network sends the active set update message in response to the first measurement report message and the UE has not receive the active set update message, the UE may send the second measurement report message (reasons can be described as above) to the network. Since the network has already updated the cell information in the active set ASET, i.e. the network identifies that the cell C has been replaced with the cell D, when the network handling the second measurement report message (notifying to replace cell B or C with the cell E), the cell C has not included in the active set ASET of the network. Thus, the network may replace the cell B in the active set ASET with the cell E, causing that the cell (e.g. the cell B) with good communication quality is replaced. In short, since the cell information in the active set ASET has been updated by the network, the second measurement report message may cause the network unnecessarily replaces/removes the cell, impacting call service/quality. Besides, the cells D and E may have good signal quality/strength only in a short period, and thereby, when the UE leaves a service area of a cell A, the radio links between the UE and the cells A, D and E in the active set ASET may be released, causing the call drop.

As can be seen, the network may face a race condition with the two measurement report messages, such as the first measurement report message notifying the network to replace the cell B or C with the cell D, and the second measurement report message notifying the network to replace the cell B or C with the cell E. In this situation, the cell replacement procedure may cause a call drop since the cell C has been replaced with the cell D. On the other hand, the network in error assumes that the cells indicated in the measurement report message for the cell replacement are all in the active set. However, since the active set has been updated by the network, the cells indicated by the measurement report message may not include in the active set, causing the communication drop.

SUMMARY OF THE INVENTION

It is therefore an object to provide a method of handling measurement reporting in a wireless communication system and a related communication means in order to reduce the probability of a call drop.

A method of handling measurement reporting for a network in a wireless communication system is disclosed. The network maintains an active set for storing at least a cell identity which is capable of providing a service to a mobile device of the wireless communication system. The method comprises receiving a measurement report message from the mobile device, wherein the measurement report message is used for notification of a cell replacement procedure and includes a first cell identity corresponding to a first cell, determining whether the first cell identity is included in the active set and whether a number of the cell identity in the active set exceeds a threshold, to generate a result, and performing the cell replacement procedure according to the result.

A method of handling measurement reporting for a network of a wireless communication system for handling measurement reporting is disclosed. The network maintains an active set for storing at least a cell identity which is capable of providing a service to a mobile device of the wireless communication system, the network comprises means for receiving a measurement report message from the mobile device, wherein the measurement report message is used for a cell replacement procedure and comprises a first cell identity corresponding to a first cell, means for determining whether the first cell identity is included in the active set and whether a number of the cell identity in the active set exceeds a threshold, to generate a result, and means for performing the cell replacement procedure according to the result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
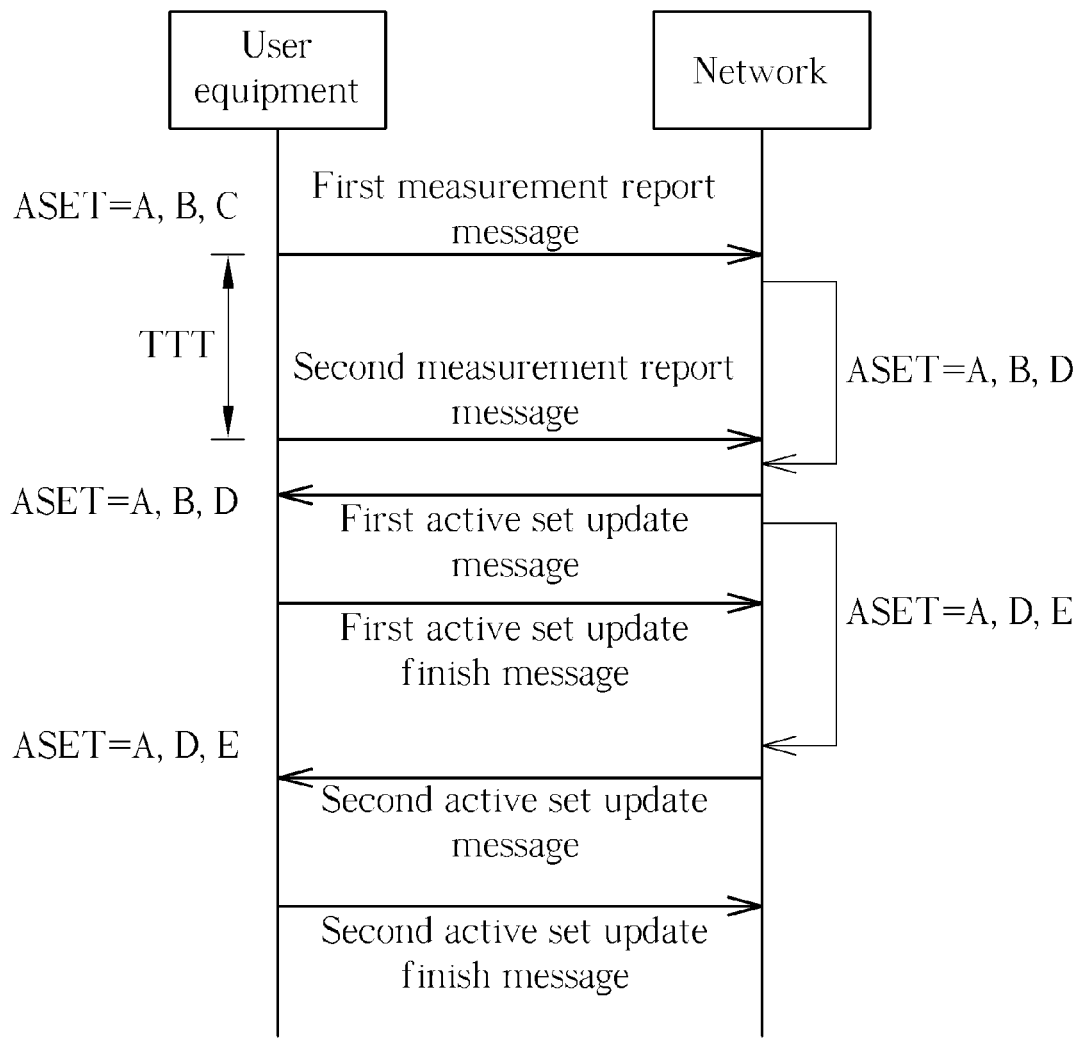
FIG. 1 is a schematic diagram of a conventional measurement reporting.
Figure 2:
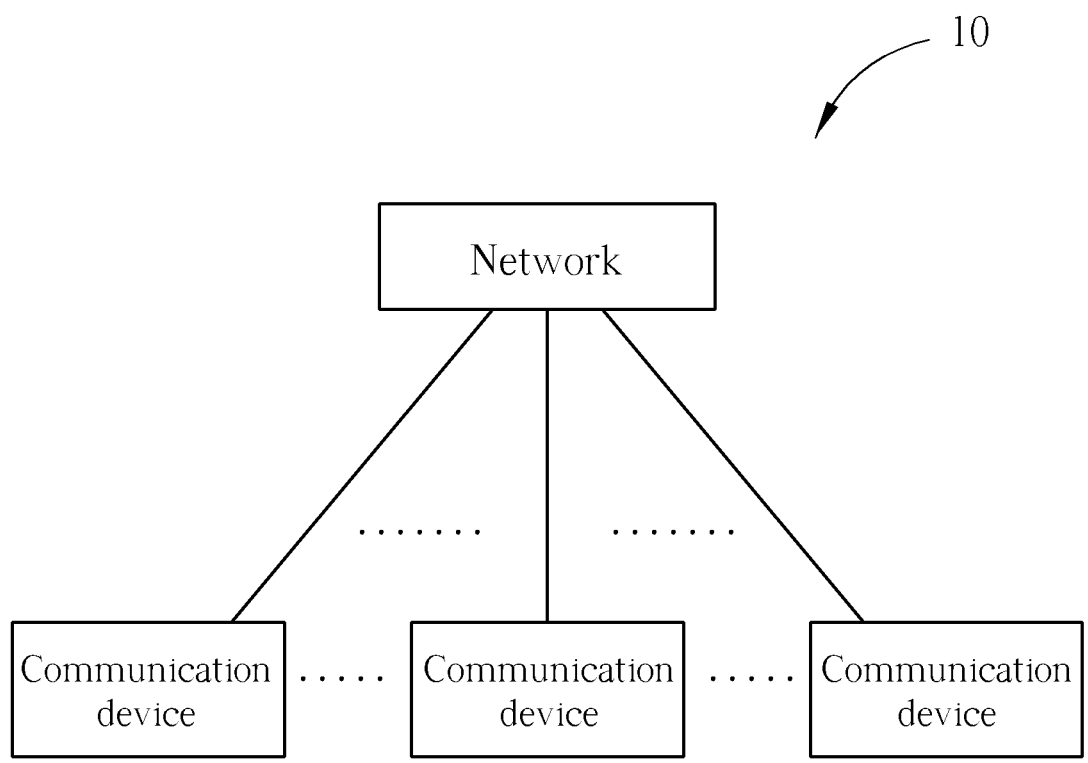
FIG. 2 is a schematic diagram of a wireless communication system according to an embodiment of the present invention.

Please refer to FIG. 2, which is a schematic diagram of a wireless communication system 10 according to an embodiment of the present invention. The wireless communication system 10 can be referred as a Universal Mobile Telecommunications System (UMTS) or any other network systems, and is briefly composed of a network and a plurality of mobile devices. In the UMTS, the network can be referred as a Universal Terrestrial Radio Access Network (UTRAN), and the mobile devices are referred as to user equipments (UEs), which can be devices such as mobile phones, computer systems, etc. Besides, the network and the UE may be seen as a transmitter or receiver according to transmission direction. For example, for uplink (UL), the UE is the transmitter and the network is the receiver, and for downlink (DL), the network is the transmitter and the UE is the receiver.

Figure 3:
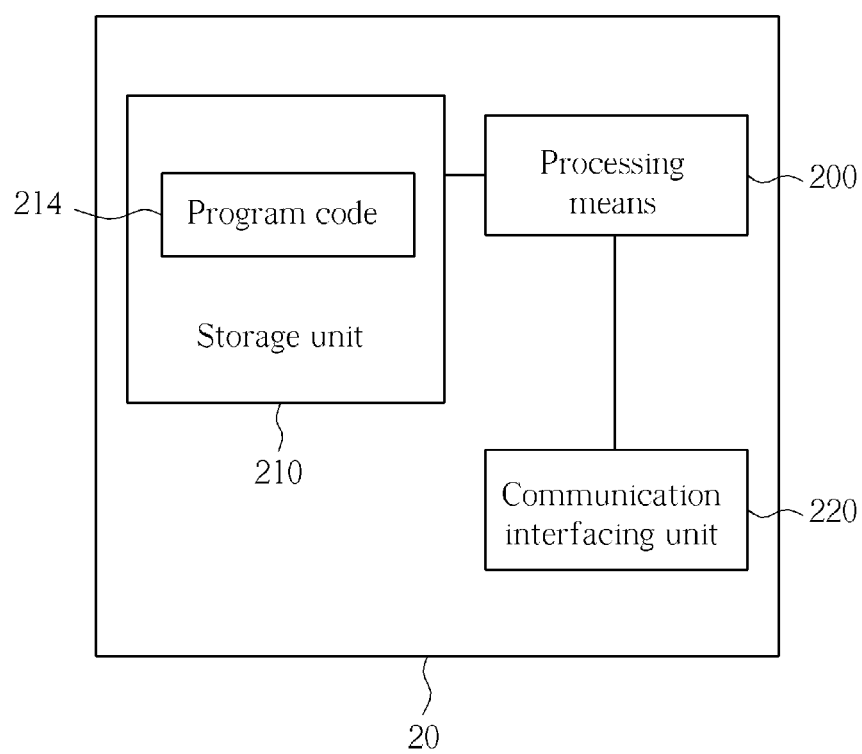
FIG. 3 is a schematic diagram of a communication device according to an embodiment of the present invention.

Please refer to FIG. 3, which is a schematic diagram of a communication device 20 according to an embodiment of the present invention. The communication device 20 can be the network shown in FIG. 2. The communication device 20 may include a processing means 200, a storage unit 210 and a communication interfacing unit 220. The processing means 200 may be a microprocessor or an application specific integrated circuit (ASIC). The storage unit 210 may be any data storage device that can store a program code 214, and access and execute the program code 214 by the processing means 200. For example, the storage unit 210 includes but are not limited to a subscriber identity module (SIM), read-only memory (ROM), random-access memory (RAM), CD-ROMs, magnetic tapes, floppy disks, and optical data storage devices. The communication interfacing unit 220 is preferably a radio transceiver and can exchange wireless signals with the UE according to processing results of the processing means 200.

Figure 4:
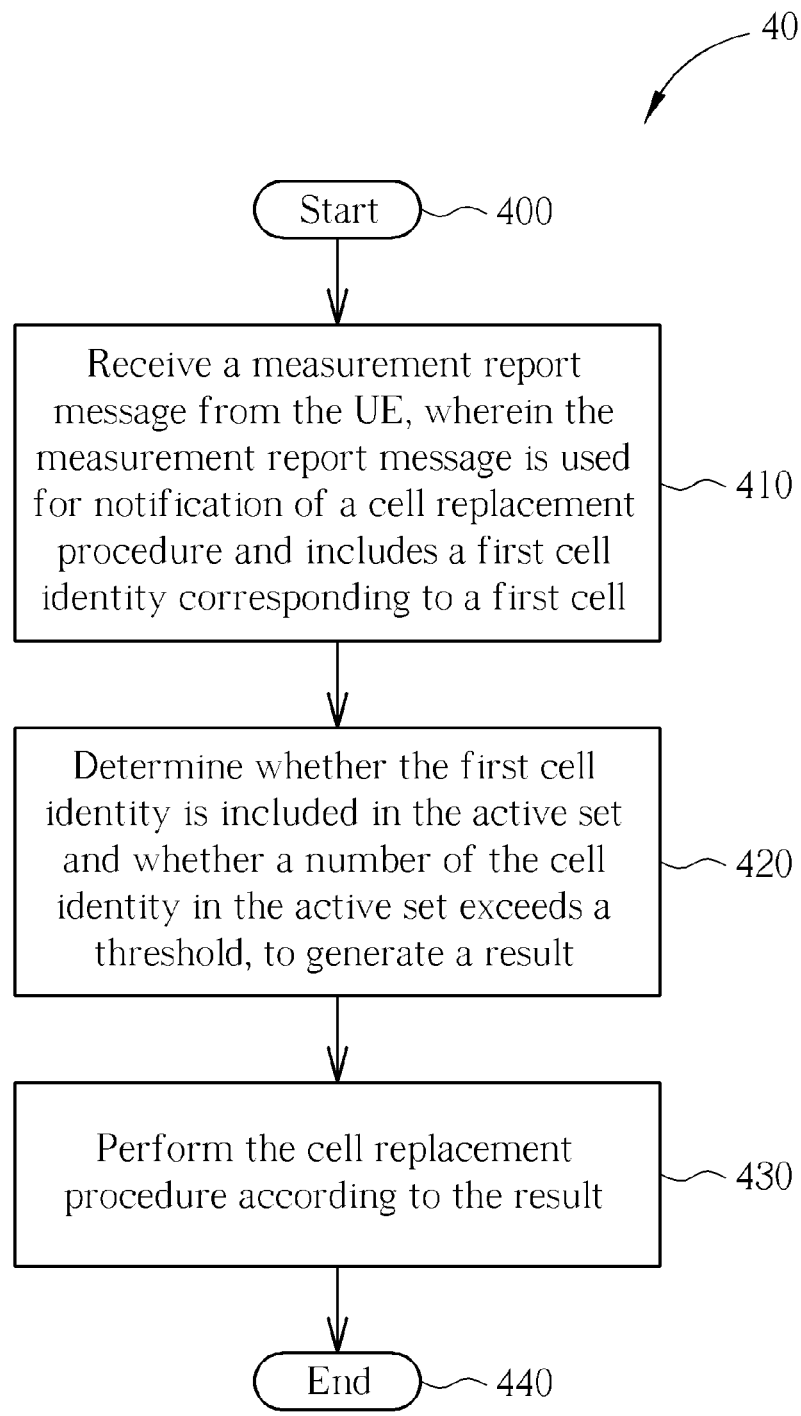
FIG. 4 is a flowchart of a process according to an embodiment of the present invention.

Please refer to FIG. 4, which is a schematic diagram of a process 40 according to an embodiment of the present invention. The process 40 is utilized in a network for handling measurement reporting. The network maintains an active set for storing at least a cell identity which is capable of providing a service to the UE. The process 40 may be compiled into the program code 214 and includes the following steps:

Step 400: Start.
Step 410: Receive a measurement report message from the UE, wherein the measurement report message is used for notification of a cell replacement procedure and includes a first cell identity corresponding to a first cell.
Step 420: Determine whether the first cell identity is included in the active set and whether a number of the cell identity in the active set exceeds a threshold, to generate a result.
Step 430: Perform the cell replacement procedure according to the result.
Step 440: End.

According to the process 40, when the network receives the measurement report message, the network first determines whether the first cell identity known as the cell to be replaced in the measurement report message is included in the active set, and then determines whether the number of the cell identity in the active set exceeds a cell replacement activation threshold known as a minimum number of cells allowed in the active set. The network does not trigger the cell replacement procedure when determining the first cell identity is not included in the active set and the number of the cell identity in the active set exceeds the cell replacement activation threshold, and adds the first cell identity in the active set and removes no cell in the active set when the first cell identity is not included in the active set and the number of the cell identity in the active set does not exceed the cell replacement activation threshold, to avoid a race condition causing a call drop in the cell replacement procedure (e.g. the network receives two measurement report messages respectively, and two measurement report messages both indicate to replace the same cell). The detailed illustrates can be derived by referring to the above, so it is not given herein. On the other hand, the network performs the general cell replacement procedure if the first cell identity is included in the active set and the number of the cell identity in the active set exceeds the cell replacement activation threshold.

Figure 5:
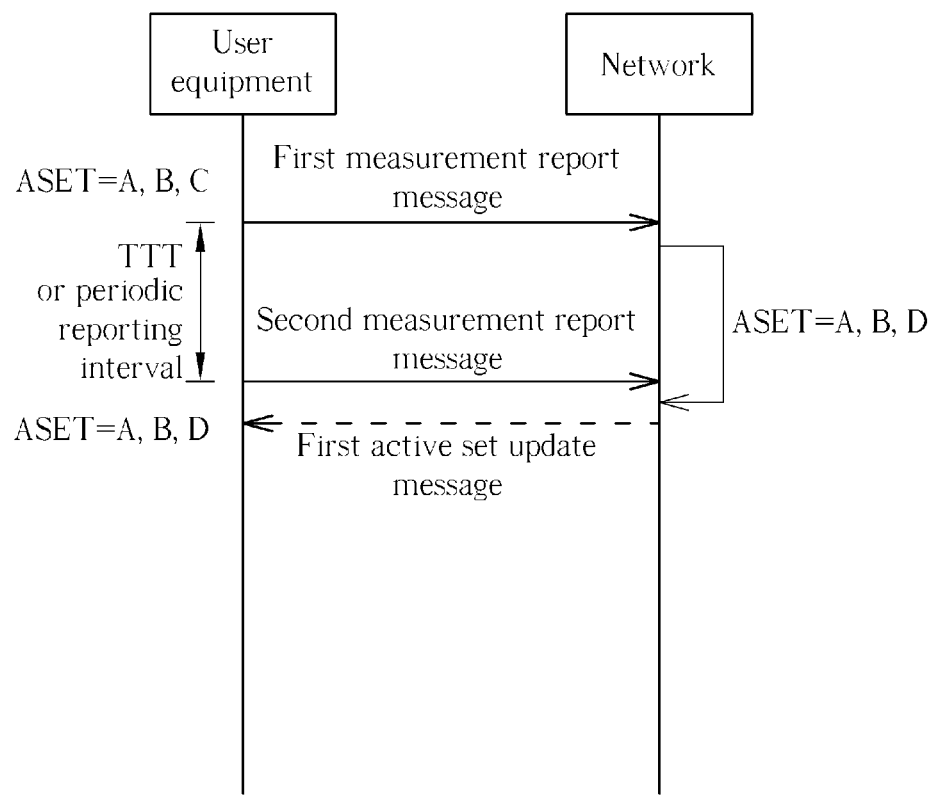
FIG. 5 is a schematic diagram of a measurement reporting according to an embodiment of the present invention.

Based on the concept of the process 40, examples of illustrate are as following, and please refer to FIG. 5. The UE sends a first measurement report message triggered by 1c type event to the network, wherein the first measurement report message notifies the network to replace a cell B or C with a cell D, i.e. a signal quality at a common pilot channel (CPICH) corresponding to the cell D is greater than common pilot channels corresponding to cells B, C, the detailed illustrates can be derived by referring to 3GPP communication protocol TS 25.331. Assuming that the signal quality of the cell C is the weakest in the active set ASET, and thereby, the network may replace the cell C with the cell D, and sends a first active set update message used for notifying the UE. Meanwhile, cell information in the active set ASET is updated with cells A, B and D. However, the network receives a second measurement report message (which meets the condition of a time-to trigger or a periodic reporting interval, the detailed illustrates can be derived by referring to the above, so it is not given herein) from the UE before sending the first active set update message, wherein the second measurement report message notifies the network to replace the cell B or C with a cell E. In this situation, the network first determines whether cell identities of the cells B, C are included in the active set. The cell identity of the cell C is not included in the active set since the active set has been updated to include the identities of the cells A, B and C. In addition, the network determines whether the number of the cell identity in the active set exceeds the cell replacement activation threshold. The network adds the cell E in the active set when determining the number of the cell identity in the active set is less than the cell replacement activation threshold, and does not trigger the cell replacement procedure when determining the number of the cell identity in the active set is greater than the cell replacement activation threshold, to avoid the cells in the active set be replaced/removed with unnecessary, causing a call drop.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the present invention provides the method of handling measurement reporting and the apparatus in order to reduce the probability of the call drop.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling measurement reporting for a network in a wireless communication system, the network maintaining an active set for storing at least a cell identity which is capable of providing a service to a mobile device of the wireless communication system, the method comprising:

receiving a measurement report message from the mobile device, wherein the measurement report message is used for notification of a cell replacement procedure and includes a first cell identity corresponding to a first cell for the cell replacement procedure;

determining whether the first cell identity is included in the active set and whether a number of the cell identity in the active set exceeds a threshold, to generate a result; and performing the cell replacement procedure according to the result, wherein the performing step comprises:

not triggering the cell replacement procedure when determining the first cell identity is not included in the active set and the number of the cell identity in the active set exceeds the threshold.

2. The method of claim 1, wherein the step of performing the cell replacement procedure according to the result comprises:

adding the first cell identity in the active set and removing no cell in the active set when the first cell identity is not included in the active set and the number of the cell identity in the active set does not exceed the threshold.

3. The method of claim 1, wherein the threshold is a minimum number of cells allowed in the active set.

4. A network of a wireless communication system for handling measurement reporting, the network maintaining an active set for storing at least a cell identity which is capable of providing a service to a mobile device of the wireless communication system, the network comprising:

means for receiving a measurement report message from the mobile device, wherein the measurement report message is used for notification of a cell replacement procedure and includes a first cell identity corresponding to a first cell for the cell replacement procedure;

means for determining whether the first cell identity is included in the active set and whether a number of the cell identity in the active set exceeds a threshold, to generate a result; and means for performing the cell replacement procedure according to the result, wherein the means for performing the cell replacement procedure according to the result further comprises:

means for not triggering the cell replacement procedure when determining the first cell identity is not included in the active set and the number of the cell identity in the active set exceeds a threshold.

5. The network of claim 4, wherein the means for performing the cell replacement procedure according to the result further comprises:

means for adding the first cell identity in the active set and removing no cell in the active set when the first cell identity is not included in the active set and the number of the cell identity in the active set does not exceed the threshold.

6. The network of claim 4, wherein the threshold is a minimum number of cells allowed in the active set.

\* \* \* \* \*